Dec. 16, 1958     R. I. LAPPIN ET AL     2,864,257
POWER UNIT FOR KITCHEN APPLIANCES
Filed Nov. 16, 1954     3 Sheets-Sheet 3
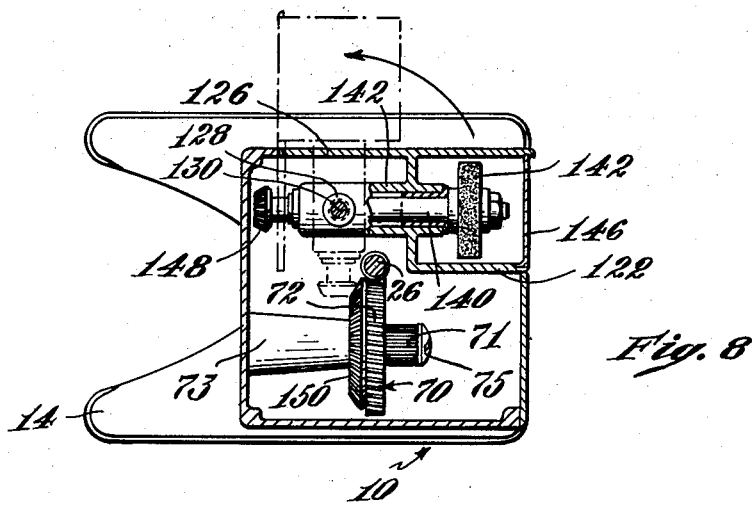
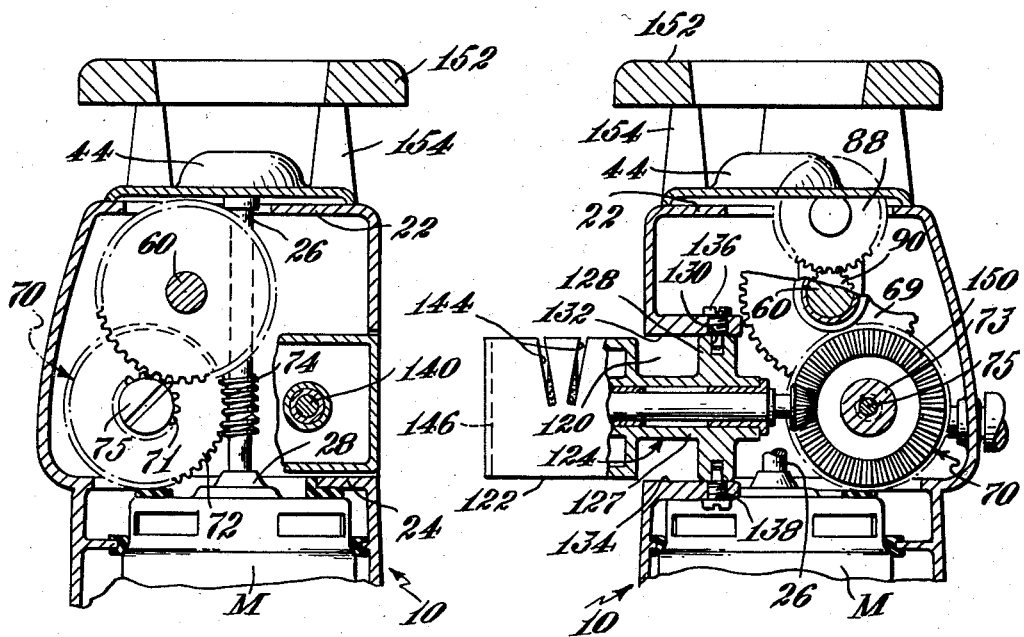
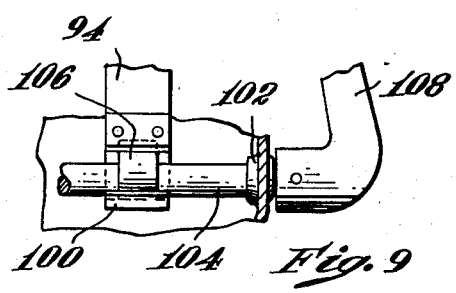
Inventors
Robert I. Lappin
Louis Zaiger
by Roberts, Cushman & Grover
Att'ys

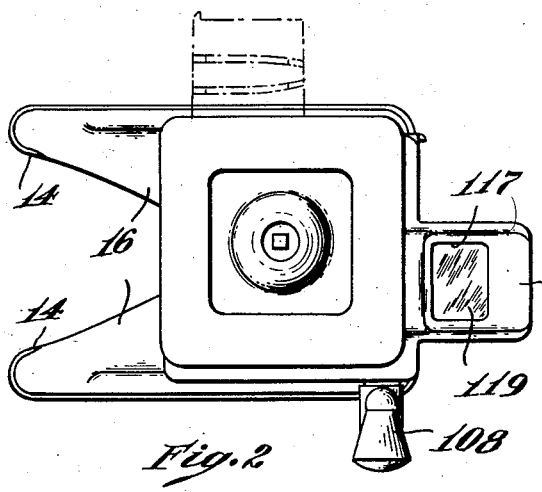
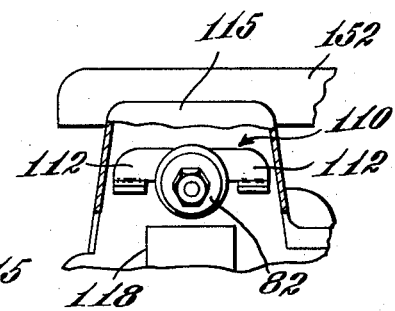
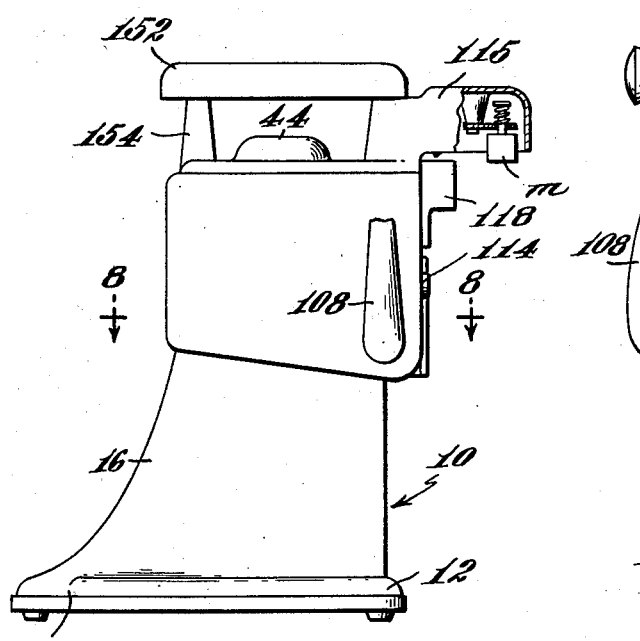
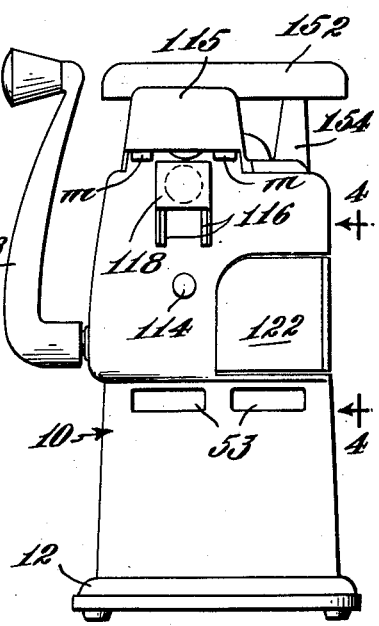
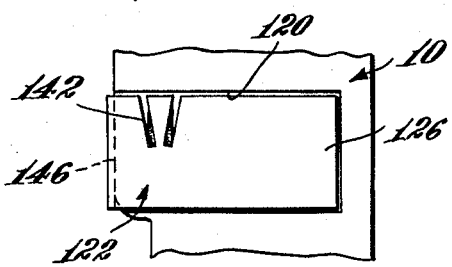

United States Patent Office 2,864,257
Patented Dec. 16, 1958

2,864,257

POWER UNIT FOR KITCHEN APPLIANCES

Robert I. Lappin, Marblehead, and Louis Zaiger,
Swampscott, Mass.

Application November 16, 1954, Serial No. 469,182

2 Claims. (Cl. 74—16)

This invention relates to kitchen appliances and more especially to a power unit for supplying the drive for several different kitchen appliances.

There are many kinds of motor driven kitchen appliances available for expediting food preparation, such as cake mixers, drink mixers, meat grinders and slicers, vegetable choppers and so forth, each of which is an independent unit consisting of a suitable supporting frame, a motor and the mechanism of the particular appliance. Such units are comparatively expensive and take up considerable space, and hence to completely equip a kitchen with power driven appliances in such number as to perform the various operations desired is expensive and clutters up most of the available counter space. Additionally it is not convenient to use several different units at once because of an insufficient number of electric outlets available, nor is it conducive to efficiency to have several different appliances each of which has only one function and hence must be cleaned and put away when another is to be used, thus multiplying the amount of working and cleaning required.

The principal object of this invention is to provide a single power unit for supplying power to a number of different appliances and with which are permanently associated other appliances so that the entire number of appliances powered by this unit affords a gamut which is substantially all inclusive of the operation normally encountered in food preparation. Another object is to provide a unit with which appliances may be used which are desirably operated at different speeds. Another object is to provide a unit with which two appliances may be connected and powered without interference with each other. Another object is to provide a power unit with permanently attached appliances which do not interfere with the appliances coupled thereto or with each other and which may be used simultaneously with other of the appliances or independently thereof. Another object is to provide a power unit in which the non-permanent appliances may be coupled or uncoupled without interfering with the continuous delivery of power to each other or to the permanently attached appliances. Another object is to provide one of the permanently attached appliances with a mount which permits it to be moved from an exposed operable position to a concealed position. Another object is to provide a unit in which the delivery of power to the various appliances is effected in such a manner as to subject the motor and driving shaft to a minimum amount of wear and frictional resistance to rotation and to transmit the least amount of vibration to the unit. Another object is to provide a unit in which the motor heat is dissipated to the best advantage. Other objects are to provide a unit which is of attractive design, compact, durable, requires little upkeep, the parts of which are inexpensive to replace and not difficult to install, which is easy to keep clean and is efficient in delivery of its power.

In accordance with the foregoing objects the unit has a rigid hollow column-like frame with a broad base which affords a stable footing therefor. At the top of the column and in one side there are take-off openings in which there are coupling elements. The respective coupling elements are fast to vertical and horizontal shafts mounted within the column and these are driven by a motor at the bottom of the column. The vertical shaft derives its rotation directly from the motor and the horizontal shaft through suitable gearing derives its rotation from the vertical shaft at a different rotational speed. The top and side power outlets are so located that an appliance connected to the coupling at the top can be used independently and/or simultaneously with an appliance connected to the coupling in the side. Permanent appliances are also mounted on the column and there are driving elements for delivering power thereto from the aforesaid shafts. One of these appliances is a can opener and there is means for guarding it when not in use to avoid accidental injury although it is located at a place apart from the other appliances so that normally it does not interfere with the use of the other appliances and thus would cause injury only to inquisitive fingers. The other which is a knife sharpener is carried by a movable mounting pivoted to move from an operative position extending horizontally from the column into an opening in the column to completely conceal it, the mounting itself having parts which blend with the walls of the column when it is moved into the opening. The drive for the knife sharpener is engaged with the sharpener only when the mount is swung outwardly to its operative position. The main drive shaft is made an integral extension of the motor shaft or its rigidly connected thereto, the latter providing the bearing for this end of the shaft through the journals in the motor housing. To minimize binding and friction throughout the driving mechanism the motor is placed at the bottom of the column with cushion elements beneath its lower end, at its upper end and at its sides so that it is constrained against movement axially or at right angles thereto. The upper end of the drive shaft has a cushion bearing at the top of the column adjacent the top coupling. The heat generated in the motor is dissipated by providing intake openings at the bottom of the column at the lower end of the motor, exhaust openings in the wall of the column near the top end of the motor, and baffle means blocking the space between the column and the motor housing intermediate the ends so that a natural draft is set up which enters the lower end of the motor housing and passes upwardly through the top end of the motor housing and outwardly through the exhaust openings. A fan may be employed to augment this draft.

The invention will now be described in greater detail with reference to the accompanying drawings wherein:

Fig. 1, is an elevation of the power unit as seen from one side thereof;

Fig. 2 is a top view of the power unit;

Fig. 3 is an elevation of the power unit as seen from the left-hand side of Fig. 1;

Fig. 4 is a fragmentary elevation taken on the line 4—4 of Fig. 3;

Fig. 6 is a fragmentary elevation partly in section taken on the line 6—6 of Fig. 5;

Fig. 7 is a fragmentary elevation partly in section taken on the line 7—7 of Fig. 5;

Fig. 8 is a horizontal sectional section taken on the line 8—8 of Fig. 1;

Fig. 9 is a fragmentary elevation taken on the line 9—9 of Fig. 5; and

Fig. 10 is a fragmentary elevation of the can opener viewed from the left side of Fig. 1 with part of the cover broken away.

Figure 5:
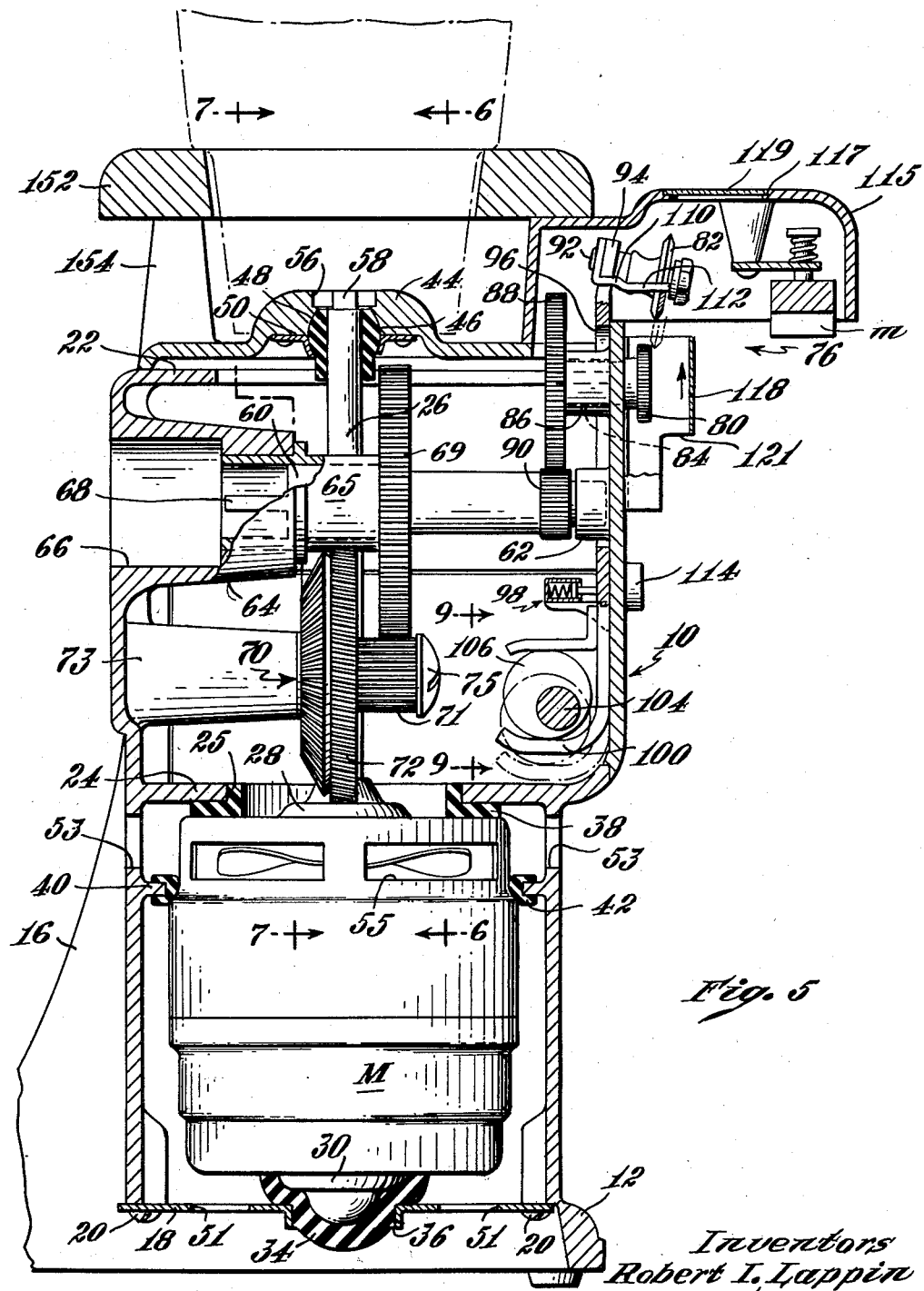
Fig. 5 is an elevation of the power unit partly in section as seen from the front side of Fig. 1 showing the internal driving mechanism.

Referring to the drawings, especially Figs. 1, 2, 3 and 5, the unit has a hollow column-like frame 10 at the lower end of which is a base or footing 12, portions of which extend laterally at one side of the column in the form of a pair of spaced feet 14 which are reinforced by vertically rising webs 16 cast integral therewith and with the wall of the column. The lower end of the column (Fig. 5) is closed by a flat sheet metal plate 18 fastened thereto by screws 20 which are screwed into appropriately thickened portions of the wall at the lower end. The upper end of the column is partially closed by a horizontal wall 22 cast integral therewith and intermediate the upper and lower ends there is a horizontal partition or division wall 24 which divides the column into upper and lower chambers, the upper chamber being adapted to contain gearing and the lower a motor.

The motor M is of conventional kind of about ⅛ horsepower capacity and has a long motor shaft 26 extending from one end thereof which is herein shown as integral with what would normally be the armature shaft of the motor although it is to be understood that the shaft 26 could be a separate member rigidly fastened by suitable means to the armature shaft. The shaft 26 at its lower end derives support solely from the motor housing bearings 28 and 30 which are formed integral with the opposite ends of the motor housing. The motor and shaft are placed in the column with the motor at the bottom and the shaft extending upwardly toward the top through an opening 25 (Fig. 5) in the partition 24. The motor is supported in its compartment by cushions in a fashion to prevent axial movement or movement at right angles thereto and yet to allow some yielding movement so as to minimize binding and further to prevent transmission of vibrations or noise to the frame. To this end a cap or button 34 comprised of a yieldable substance, for example rubber or some synthetic bearing material such as nylon, is placed between the lower end of the motor and the bottom of the column. The cap has a circular flange which fits tightly over the externally projecting portion of the lower motor bearing 30 so as to hold it concentric with the axis of the motor shaft and a crown seated within a circular flanged opening 36 in the plate 18. An annulus 38 of like material having right-angularly arranged flanges is placed between the upper end of the motor and the underside of the partition 24 with its vertical flange engaged within the opening 25 and its horizontal flange engaged between the motor and the partition. Lateral movement of the motor is constrained by a cushion member 42 placed between the motor housing and the inside wall of the column near the upper end of the motor. The cushion 42 is comprised of a substance like that of the other cushions and has an external peripheral groove which is engaged with a rib 40 formed integral with the wall of the column. The rib and the cushion supported thereby not only prevents movement of the motor but also effectually divides the motor chamber into upper and lower portions which are substantially sealed from each other for a reason which will appear hereinafter. The upper end of the shaft 26 extends upwardly through the top wall 22 into an elevated bearing boss 44 which is cast integral with the wall 22 and has through it a vertical bore concentric with the axis about which the shaft 26 is designed to rotate. Internally the boss 44 is recessed at 46 to receive a cushion bearing 48 through which the upper end of the shaft passes and is yieldably supported. The bearing 48 is secured in the recess by a flanged plate 50 placed against the underside of the bearing and screwed to the boss. The top or outer end of the bearing boss 44 has a circular recess 56 therein into which projects the end of the shaft 26 and the latter is reduced at its end so as to provide a substantially rectangular coupling tip 58. As thus supported the motor and shaft are free to yield slightly so that any unusual stress applied to the drive shaft due to a reactive force imparted thereto by the torsional load applied to its upper end or from a take-off intermediate its ends, as will appear hereinafter, will not cause binding or friction.

The recess 56 at the top of the column provides a top power take-off for an appliance mounted on the top of the housing and has in it the driving tip 58 which is adapted non-rotatably to receive a socket element carried by the appliance.

The unit is also provided with a side power take-off and to this end a countershaft 60 (Figs. 5 to 8) is mounted in the upper chamber of the column in a horizontal position with one end journaled in a bearing 62 and its other end journaled in a bearing 64 and bushing 65 so that its axis is concentric with an opening 66 in the wall of the column. The end of the shaft within the bearing 64 has projecting from it a bayonet coupling element 68 which is adapted to be engaged within a slot carried by an appliance fitted to the side power take-off. The horizontal countershaft 60 is driven from the vertical shaft 26 and this is effected by a gear 69 fast thereto which meshes with a pinion 71 fastened to one face of a gear 70 which has peripheral teeth 72 meshing with a worm 74 formed on the shaft 26. The gear 70 is rotatably mounted on a stud 75 extending from a bearing boss 73. As thus arranged the outlet or take-off at the top of the column has a rotational speed corresponding to that of the motor while that of the side take-off has a different rotational speed and preferably as herein designed a lower speed in the order of approximately 600 R. P. M.

The most effective use of this unit is derived by having the motor constantly connected to the source of electric current so that it rotates continuously. Accordingly there is bound to be some heating and in order that this may be dissipated as rapidly and efficiently as possible the plate 18 (Fig. 5) at the lower end of the column has formed in it a plurality of intake openings 51 so that air may enter the lower end of the column through these openings into the space below the sealing gasket 42. Exhaust openings 53 are made in the wall of the column above the sealing gasket 42 adjacent the upper end of the motor through which air passing through the motor may be discharged. Since motors conventionally are provided with openings in their housings at opposite ends, the upper ones of which are shown at 55, it is evident that a natural circulation of air due to a vertical draft will take place entering the intake openings 51 rising through the motor housing between its armature and stator and passing outwardly through the openings 55 and exhaust openings 53 thus effectively cooling the motor. To augment the circulation a fan may be fastened to the motor shaft within the motor housing adjacent the openings 55 which being conventional is not shown herein.

The unit as thus designed has top and side power outlets located substantially at right angles to each other for delivering rotational power about vertical and horizontal axes to which any number of appliances may be coupled depending upon the rotational speed desired for kitchen use. Additionally there are permanently attached to the unit two power driven appliances, one of which is a can opener 76 (Figs. 1, 2, 3, 5 and 10) and the other of which is a knife sharpener 78 (Figs. 3, 4, 7, 8 and 9).

The can opener 76 is mounted on the column at the side opposite the power take-off 66 and near the top of the column so that it is conveniently accessible and can be used independently of appliances coupled to the take-off openings either at the top or side whether they are in use or not. The can opener consists of a feed roll 80 and a cutter roll 82 of conventional kind and of such proportions as to be universally applicable in cutting through a can presented thereto peripherally of its upper rim at the inside thereof whether the can be of circular or rectangular cross section. By locating the instrumentalities high on the side of the column cans of maximum vertical dimensions may be opened. The feed roll 80 has the usual knurled or tooth edge to afford a frictional grip for traversing the can and is fastened to a horizontal shaft 84 journaled in a bearing 86 formed on the wall of the column. The shaft 84 has fastened to its inner end a gear 88 and this meshes with a gear 90 fast to the horizontal shaft 60. Thus the feed wheel 80 derives its rotary motion from the horizontal shaft 60. The cutter wheel 82 has a beveled cutting edge of conventional design and is mounted to turn freely on a stub shaft 92, the latter being fixed at its rear end to the upper end of a slide plate 94 so as to incline downwardly toward the feed roll. By choosing the angle at which the shaft 92 inclines toward the feed wheel carefully the cutter wheel 82 may be held at an accurately spaced position with reference to the feed wheel so that precision cutting is effected as distinguished from the rather imperfect cutting and hence slippage of customarily designed can opener mechanism. Moreover by fixing the cutter close to the feed wheel the inner face of the beveled cutting edge, shown in its operating position in dotted line, operates in such close conjunction to the rim of the can as it cuts therethrough that it presses the cut's somewhat jagged edge downwardly against the inside wall of the can thereby minimizing danger of cutting oneself on the can after the cover is removed. The cutting wheel 82 is brought into operative position by moving the slide plate 94 supporting it downwardly. To this end the slide plate which is mounted against the inner side of the column has an elongate slot 96 therein which closely and slidably embraces the bearing bosses 62 and 86 which guide it vertically. While not shown, keepers are screwed to the inside of the column over the opposite edges of the slide plate to hold it in contact with the wall, and yieldable means in the form of one or more coiled springs 98 may be placed against the back of the plate to assist in holding it in place. The lower end of the slide plate has a yoke 100 (Figs. 5 and 9) which embraces the lower side of a cam disk 106. The cam disk 106 is fast to a horizontal shaft 104 journaled in suitable bearings, one of which is shown at 102 and has an end projecting outwardly from the column to which is made fast a crank handle 108. By rotating the handle 108 from the vertical position shown in Fig. 3 to a horizontal position the cutter 82 may be drawn down into engagement with the top of the can so as to press the latter against the feed wheel 80 and to initiate feeding of the can peripherally of its rim.

To insure proper positioning of the can with reference to the cutter so as not to depend upon the skill or care of the person presenting the can to the can opener, positioning means are provided to hold the top of the can substantially horizontal and to hold the wall of the can substantially vertical. The former shown at 110 (Fig. 10) is fastened to the plate 94 (Fig. 5) and has horizontally extending arms 112 located at opposite sides of the axis of the shaft 92 which are adapted to bear upon the top of the can at opposite sides of the cutter thus to hold it in a horizontal position with respect to the cutter. The latter comprises a boss or button 114 on the outside of the column vertically below the cutter which projects outwardly far enough to engage the wall of the can and to hold the latter in a position substantially parallel to the face of the feed roll 80.

Because of the tendency of the top of the can after it has been completely severed to drop into the can with the result that much trouble ensues from trying to dislodge it frequently resulting in spilling the contents and/or cutting the hands, a powerful permanent magnet $m$ (Figs. 1, 3 and 5) is installed above the cutter which will fasten to the top of the can so that when the top is completely severed and the can lowered from the cutter the top will remain engaged with the magnet. Conveniently the magnet has spaced ends which grip the can top at spaced points and is yieldably suspended from the underside of the cover by a pin, spring and bracket plate.

While the can opener is located in a position away from both the top and side power take-offs so that it does not interfere with the use of either one or the other and can be used while these are being used, it is geared to the horizontal shaft 60 so that it rotates continuously whether in use or not and consequently there is danger that someone might inadvertently place a hand against the rotating cutter 82. Accordingly a cover 115 is provided which extends horizontally from the column over the top of the cutter and may conveniently be a part of the casting. To assist one in placing the top of the can in engagement with the cutting and feeding rolls the cover 115 may have a hole 117 through it (Fig. 5) in which is mounted a Plexiglas windowpane 119. To prevent inquisitively sticking the fingers in between the cutter and the feed roll from the front or one side below the cover 115 a sliding shield plate 118 (Figs. 3 and 5) is mounted for vertical sliding movement on a pair of spaced tracks 116 (Fig. 3) directly in front of the feed roll 80. The plate 118 normally covers the feed roll and occupies this position by reason of its own weight. The shield is notched so as to provide a horizontal shoulder 121 and when a can is presented to the rolls its edge is placed against the shoulder 121 and raised so as to slide the shield upwardly on its track to permit engagement of the rim of the can with the cutting elements. The shield is narrow enough to slide upwardly between the arms 112.

The knife sharpening appliance 78 (Figs. 3, 4, 6, 7 and 8) is so mounted on the frame that it can be moved from operative to inoperative positions and in its inoperative position can be completely concealed within the frame. Accordingly the column has at one corner an opening 120 (Fig. 7) which extends through the walls at opposite sides of the corner and is of substantially rectangular shape. The blade sharpener has a substantially cubical mount 122 with which there is integrally formed a cruciform casting 124 which provides a bearing 127 for the sharpener shaft and trunnions 128 for pivotally supporting it in the opening. Also cast integral with the mounting and forming an extension of one wall thereof is a wall 126 (Fig. 8). The mounting is pivotally supported in the recess between vertically spaced parallel walls 132 and 134 forming the top and bottom of the recess by pivot pins 136 and 138 which enter in the holes 130 in the trunnions 128. Thus the mounting may be swung horizontally about a vertical axis. By properly locating the axis about which the sharpener swings and designing an end and the side which has the extension 126 so as to correspond to the areas of the wall openings defining the opening 120 at the corner, when the sharpener is swung into the opening the end and extension 126 will be flush with the walls of the column filling the opening so that it and the sharpener are substantially concealed (Figs. 3, 4, 6 and 8).

The mounting has within it a grinding disk 142 (Fig. 8) which may be comprised of Carborundum or other suitable abrasive material used for sharpening steel knives and is fastened to a horizontal shaft 140 journaled in the bearing 127. A pair of spaced slots 144 are made in the top of the mounting, which incline downwardly toward opposite sides of the disk 142 so that when the knife blade is placed in one slot it will be held with one side of its edge inclined to one of the vertical faces of the disk and when placed in the other slot will be held with the other side of the edge inclined to the other of the faces of the disk. By transferring the knife blade from first one side to the other a beveled cutting edge may be secured. The end of the mounting opposite the end of the shaft has a removable plate 146 therein to facilitate replacing the grinding disk when necessary. The inner end of the shaft 140 has a miter gear 148 fastened to it which meshes with teeth 150 formed on the rear side of the gear 70 when the sharpener is swung outwardly into operative position with its shaft at right angles to the axis of the gear 70. When the sharpener is swung into its inoperative concealed position the shaft 140 is simultaneously swung into a position parallel to the axis of the gear 70 thereby disengaging the miter gear 148 from the teeth 150 so that while the knife sharpener is concealed within the column there is no driving connection between it and the driving mechanism within the frame.

Desirably to stabilize an appliance mounted at the top of the column, such as a bowl or container for mixing fruit juices or drinks, a guard rail 152 is provided which is supported in a substantially horizontal position above the top by legs 154. The rail and legs may be part of the casting or may be attached thereto and if desired the rail may have internally of it a rubber buffer so that if the container is glass it will not be cracked by accidentally striking it against the rail.

As thus described it is at once evident that a power unit of the foregoing kind combines in a single unit the functions which heretofore have been secured only through use of a number of units and in a much more efficient and handy fashion than has heretofore been provided for. The top and side take-off couplings afford means for delivering power at the side to a meat grinder, a meat slicer, and a vegetable chopper and at the top to a cake mixer, fruit juice mixer and drink mixer. Thus the combination of the aforesaid appliance together with the power driven can opener and power driven knife sharpener constitutes a kitchen adjunct which supplies all of the various functions required in preparation of food in one simple compact unit which may be connected to one electrical outlet and requires cleaning and storage of only one unit.

It should be understood that the present disclosure is for the purpose of illustration only and that this invention includes all modifications and equivalents which fall within the scope of the appended claims.

We claim:

1. A power unit for kitchen appliances comprising a hollow pedestal-like casting having a closed top and an open bottom, a footing at the bottom end having spaced laterally extending toes at one side for counterbalancing overturn of the pedestal in that direction and integral, laterally spaced, reinforcing webs connecting the toes to the pedestal, an internally formed wall within the pedestal vertically spaced from the bottom, dividing the pedestal into lower and upper compartments, said dividing wall having a centrally located hole through it concentric with the hole in the dividing wall, a motor disposed within the lower compartment with its shaft extending perpendicular upward through the hole in the dividing wall and through the bearing hole, a removable plate screwed over the bottom opening, said plate containing a hole through it concentric with the hole in the dividing wall, a cushion element seated in the hole in the plate upon which the lower end of the motor rests, an annular cushion disposed between the upper end of the motor and the dividing wall, said cushion having a flange engaged with the opening to prevent lateral displacement and operating in conjunction with the cushion at the lower end of the motor to support and permit a limited amount of movement of the motor in the chamber, an annular rib integral with the wall of the lower compartment and projecting inwardly therefrom, said rim being situated near the top of the compartment, an annular cushion containing a groove for engagement with the rib to hold it against axial displacement, said cushion extending radially inward from the rib and having contact with the motor near its upper end, a cushion disposed in the bearing at the top of the housing through which the motor shaft passes, said latter cushion and the cushion carried by the rib in the lower compartment operating in conjunction to support the motor and shaft and to permit slight lateral movement thereof, a coupling element at the upper end of the motor shaft accessible through the bearing hole for engagement with an appliance, a support at the top of the pedestal for guiding an appliance into a position to be coupled to said coupling element and to hold it in that position, a second bearing boss in the vertical wall of the upper compartment, at the side of the toes, having a hole through it, a portion of the hole at the outer end being countersunk to afford a guide and a support for a second appliance, a coupling element supported within the inner part of the hole with which the appliance may be coupled by engagement within the outer portion of the hole, a worm on the motor shaft, and a train of gears within the upper compartment for driving the coupling element at the side at a lower rate of speed than the coupling element at the top, said gearing being rigidly supported within the upper compartment and the first one of the gears in the train being yieldably engaged by the worm on the motor shaft.

2. A power unit according to claim 1, wherein the motor housing has openings near its opposite ends providing for a flow of cooling air from the lower end of the motor upwardly within the motor housing about its armature to the upper end, exhaust openings in the lower compartment above the rib supported cushion, air intake openings in the bottom plate and means for drawing air througth the intake openings and discharging it through the exhaust openings, said cushion in the dividing wall sealing the lower chamber from the upper chamber and said rib supported cushion sealing the annular space about the motor below the exhaust opening from the space below the rib.

References Cited in the file of this patent

UNITED STATES PATENTS

| | | |
|---|---|---|
| 1,958,605 | Barber | May 15, 1936 |
| 2,046,784 | Krause | July 7, 1936 |
| 2,382,158 | Kennedy | Aug. 14, 1945 |
| 2,483,905 | Hubmann | Oct. 4, 1949 |
| 2,491,321 | Lanter | Dec. 13, 1949 |
| 2,628,320 | Humphrey | Dec. 10, 1953 |
| 2,662,421 | Van Guilder | Dec. 15, 1953 |
| 2,730,901 | Ripple | Jan. 17, 1956 |
| 2,758,623 | Malz et al. | Aug. 14, 1956 |

UNITED STATES PATENT OFFICE

CERTIFICATE OF CORRECTION

Patent No. 2,864,257                        December 16, 1958

Robert I. Lappin et al.

It is hereby certified that error appears in the printed specification of the above numbered patent requiring correction and that the said Letters Patent should read as corrected below.

Column 7, line 48, after "it" insert -- , said top having a bearing hole --.

Signed and sealed this 12th day of May 1959.

(SEAL)
Attest:
KARL H. AXLINE
Attesting Officer

ROBERT C. WATSON
Commissioner of Patents